C. ROBERTS.
Wheel Cultivator.
No. 36,859.  Patented Nov. 4, 1862.
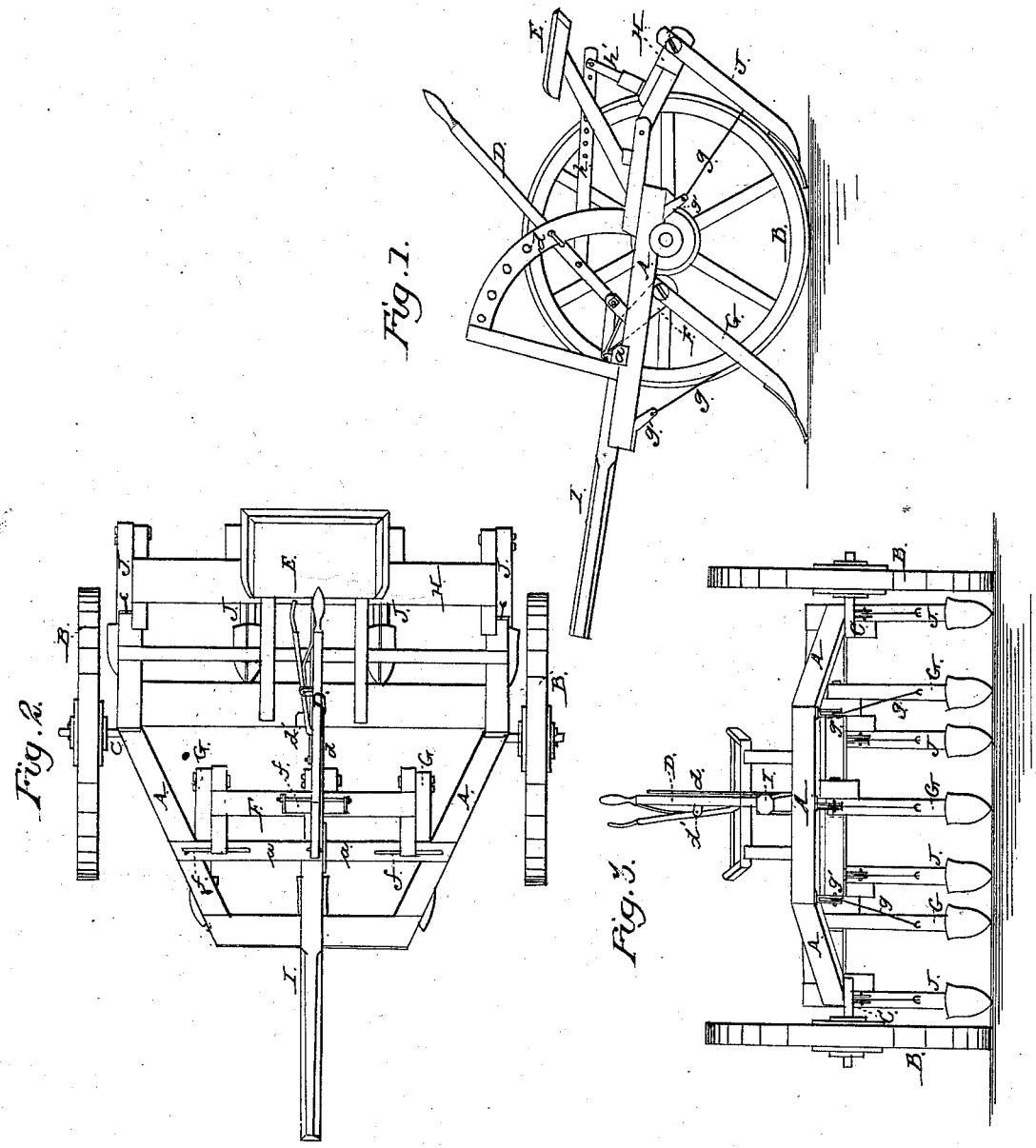

UNITED STATES PATENT OFFICE.

CYRUS ROBERTS, OF THREE RIVERS, MICHIGAN.

IMPROVEMENT IN CULTIVATORS.

Specification forming part of Letters Patent No. 36,859, dated November 4, 1862.

*To all whom it may concern:*

Be it known that I, CYRUS ROBERTS, of Three Rivers, in the county of St. Joseph and State of Michigan, have invented certain new and useful Improvements in Cultivators, of which the following is a full, clear, and exact description, reference being had to the accompanying drawings, which make part of this specification, and in which—

Figure 1 represents a view in elevation of one side of a cultivator embracing my improvements, with the near wheel removed in order to show the other parts more clearly. Fig. 2 represents a plan or top view of the same with the wheel in place. Fig. 3 represents a view in elevation of the same as seen from the front.

The improvements claimed under this patent consist, first, in mounting the front teeth in a frame pivoted in front, so that its rear end can be raised and lowered, which frame is also capable of sliding freely in its bearings in a lateral direction, as hereinafter shown, whereby many advantages are attained in working crops planted in irregular rows; secondly, in combining the frames which carry the respective rows of teeth in such manner that they can both be adjusted simultaneously so as to work at either the same or a different depth; thirdly, in attaching the stay-chains which sustain the lower part of the feet to the framework of the machine at a point in front of the hinges of the lifting-frames, and in such relation thereto that the teeth have imparted to them in rising a slight backward movement, in order to permit them to clear themselves more readily from dirt, weeds, &c., as hereinafter shown; fourthly, in arranging the tongue, driver's seat, and front and rear lifting-frames in such relation to the axle that when the driver is in his seat the machine shall be balanced, or very nearly so, upon its wheels, as hereinafter described.

In the accompanying drawings, which represent a convenient arrangement of parts for carrying out the objects of my invention, the main frame A is shown as resting upon and supported by two wheels, B, each mounted upon an independent short shaft, C. A bent hand-lever, D, is pivoted to a cross-bar, $a$, of the frame in a position where it can readily be reached by the driver from his seat E, which latter, it will be perceived, is behind the axles of the wheels. The lever can be held in any desired position by means of a curved rack, $d$, and spring-detent $d'$.

A sliding frame, F, to which the front feet, G, are attached, is pivoted at its front end to rods or bars $f$ on the cross-bar $a$, so as to slide freely back and forth when operated upon by the feet of the driver. A rod, $f'$, secured in the sliding frame at a point back of its hinges or pivots, passes freely through a hole in the lower end of the bent lever D, from which, by this means, the vertical movement of the frame F is derived without interfering with its lateral play. The tongue I is rigidly secured to the front of the frame. The hind feet, J, are attached to another frame, H, which is pivoted to the main frame A in such manner as to play vertically, but not laterally. A pivoted link rod or bar, $h$, connects this lifting-frame H with the hand-lever D, and consequently with the sliding frame F, by which means both frames can be raised or lowered simultaneously. The link-bar is also provided with a series of holes, and slides endwise in a slotted standard, $h'$, attached to the frame H. A pin passing through one of these holes serves to regulate the relative depth to which the two rows of teeth work. By this means the hind feet can be set to run more deeply into the ground than the front ones, and yet still be free to rise and fall with it, and by one and the same motion of the lever.

The feet are attached to their respective frames in such manner as to swivel vertically round their respective pivots. Each one is held in position by a stay rod or chain, $g$, fastened by a wooden pin to a swiveling bracket, $g'$, pivoted underneath the frame. When an obstacle is encountered this pin breaks and releases the tooth, which turns on its pivot and thus escapes injury. Each one of these brackets or points of attachment, it will be observed, is some distance in front of the joint of the frame to which its respective foot is attached. As a result of this arrangement, when the frames are elevated a slightly backward curvilinear movement is given to the points of the teeth, which enables them readily to free themselves from clods, weeds, and other obstructions.

The arrangement of the tongue, driver's seat, and lifting-frames relative to the wheels, it will be observed, is such that when the driver is in his seat the machine is balanced, or nearly so, upon the axles, there being in fact, however, a slight preponderance of weight to the front in order to counteract any tendency of the machine to tilt backward.

What I claim under this patent as my invention is—

1. Mounting the front feet in a frame having both a lateral and a vertical movement, when arranged and operating substantially in the manner and for the purpose described.

2. The combination of the front and rear lifting-frames, to which the respective rows of teeth are attached, with a hand-lever, substantially in the manner described, for the purpose set forth.

3. The combination of the stay-chains with the frame and feet, when arranged in relation to the joints of the lifting-frames in the manner and for the purpose specified.

4. The combination of the tongue, driver's seat, and front and rear lifting-frames, when arranged in relation to the wheels substantially as herein described, for the purpose of balancing the machine, as set forth.

In testimony whereof I have hereunto subscribed my name.

CYRUS ROBERTS.

Witnesses:
　JOS. B. MILLARD,
　R. S. MORRISON.